(12) United States Patent
Hady et al.

(10) Patent No.: US 8,140,474 B2
(45) Date of Patent: Mar. 20, 2012

(54) AGGREGATION OF FILE/DIRECTORY STRUCTURES

(75) Inventors: Frank Hady, Portland, OR (US); Brendan Traw, Portland, OR (US); John W Carroll, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 11/900,748

(22) Filed: Sep. 13, 2007

(65) Prior Publication Data
US 2009/0077141 A1    Mar. 19, 2009

(51) Int. Cl.
*G06F 7/00* (2006.01)
(52) U.S. Cl. ......... 707/621; 707/625; 707/831; 709/203
(58) Field of Classification Search .................. None
See application file for complete search history.

(56) References Cited

U.S. PATENT DOCUMENTS

| | | | |
|---|---|---|---|
| 5,897,638 A * | 4/1999 | Lasser et al. ........................... 1/1 |
| 5,987,506 A * | 11/1999 | Carter et al. .................. 709/213 |
| 6,256,031 B1 * | 7/2001 | Meijer et al. .................. 715/854 |
| 6,408,298 B1 * | 6/2002 | Van et al. ................................ 1/1 |
| 6,671,688 B1 * | 12/2003 | Nikols et al. ........................... 1/1 |
| 6,754,696 B1 * | 6/2004 | Kamath et al. ............... 709/213 |
| 7,805,469 B1 * | 9/2010 | Nagaralu et al. ............. 707/822 |
| 7,827,201 B1 * | 11/2010 | Gordon et al. ................ 707/792 |
| 2001/0051955 A1 * | 12/2001 | Wong ............................. 707/201 |
| 2002/0051641 A1 * | 5/2002 | Nagaoka ........................ 396/429 |
| 2002/0152230 A1 * | 10/2002 | Gusler et al. ................... 707/204 |
| 2004/0019640 A1 * | 1/2004 | Bartram et al. ............... 709/205 |
| 2004/0098415 A1 * | 5/2004 | Bone et al. ..................... 707/200 |
| 2005/0131959 A1 * | 6/2005 | Thorman et al. .............. 707/200 |
| 2005/0165735 A1 * | 7/2005 | Lin et al. ........................... 707/2 |
| 2006/0020637 A1 * | 1/2006 | Kedem .......................... 707/200 |
| 2006/0047716 A1 * | 3/2006 | Keith, Jr. ....................... 707/203 |
| 2007/0112791 A1 * | 5/2007 | Harvey et al. ................. 707/100 |
| 2008/0005133 A1 * | 1/2008 | Khalidi et al. ................ 707/100 |
| 2008/0082488 A1 * | 4/2008 | Terrell ............................... 707/3 |
| 2008/0109394 A1 * | 5/2008 | Havens et al. .................... 707/1 |
| 2008/0281788 A1 * | 11/2008 | Frieder et al. ..................... 707/3 |

OTHER PUBLICATIONS

Gifford, David K., et al., "Semantic File Systems", *Programming Systems Research Group MIT Laboratory for Computer Science*, ACM 0-89791-447-3/91/0009/0016, (1991), pp. 16-25.

Wright, Charles P., et al., "Versatility and Unix Semantics in Namespace Unification", *ACM Transactions on Storage (TOS)*, (Nov. 2005),15 pgs.

* cited by examiner

*Primary Examiner* — Vei-Chung Liang
(74) *Attorney, Agent, or Firm* — Ryder, Lu, Mazzeo and Konieczny, LLC; Douglas J. Ryder (57) ABSTRACT

In general, in one aspect, a method is disclosed that includes storing a superset of data available to a client having non volatile memory (NVM) on a distant hard drive. A subset of the data is maintained in the NVM on the client. The client controls the data stored on the distant hard drive and the data maintained in the NVM. A single merged directory/file tree image is generated for the content maintained in the NVM and the distant hard drive that is accessible to a user of the client and applications running thereon.

26 Claims, 10 Drawing Sheets

AGGREGATION OF FILE/DIRECTORY STRUCTURES

BACKGROUND

Portable devices (e.g., laptop, personal digital assistant, cell phone) continue to gain in popularity. Portable devices tend to be of a compact size and operate on portable power sources (e.g., batteries). Accordingly, components utilized in portable devices typically have a reduced size and lower power consumption. Portable devices often utilize non-volatile memory (NVM) rather than hard disk drives (HDD) since the NVM may be much smaller than HDD and utilize less power. NVM may also be quieter and more rugged than HDD.

Consumers often have multiple consumer electronic devices (e.g., laptop computer, personal digital assistant, cell phone, stereo, digital video recorder, computer). The multiple consumer electronic devices (CEDs) may be networked and/or integrated together within a central location (e.g., residence). The networking may provide the currently used CED access to datasets contained on the various other CEDs within the network. Each CED may be viewed as a unique drive with the datasets contained thereon illustrated as a directory/file structure for that drive. Additionally these CEDs may also benefit from NVM storage for traits such as silent storage.

BRIEF DESCRIPTION OF THE DRAWINGS

The features and advantages of the various embodiments will become apparent from the following detailed description in which.

DETAILED DESCRIPTION

Figure 1A:
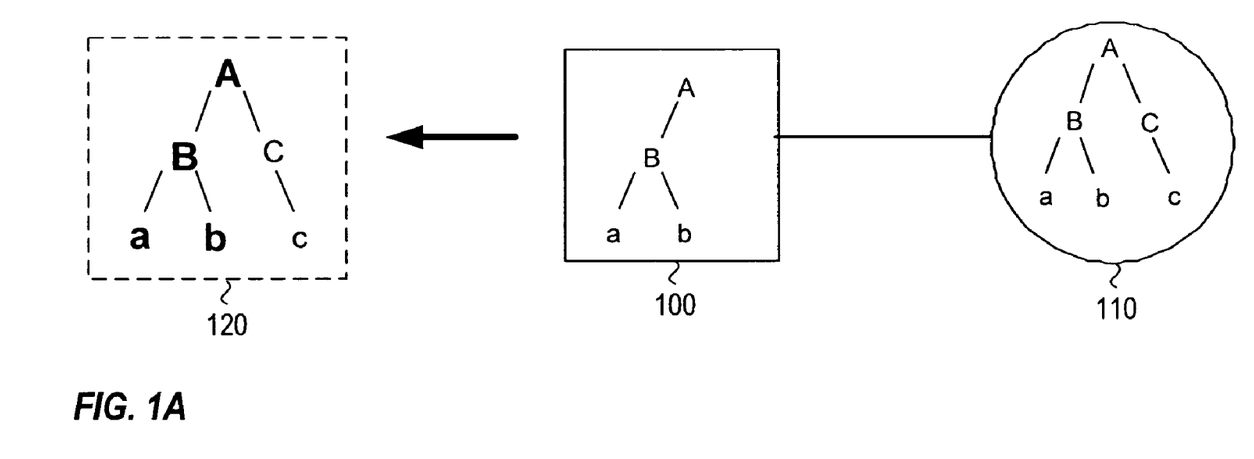
FIG. 1A illustrates an example communication between a client and distant storage, according to one embodiment.

FIG. 1A illustrates an example communication between a client 100 and distant storage 110. The client 100 may be a portable device (e.g., laptop, personal digital assistant, cell phone, digital music player) having limited storage capability. The limited storage capability of the client 100 may be non-volatile memory (NVM), such as silicon based NAND or NOR memory, a hard disk drive (HDD), optical storage, or solid state memory. The distant storage 110 may provide additional storage capability and may be a HDD, a USB drive, optical storage, or solid state memory. The distant storage 110 is separate from the client 100 (different device) but is connectable to the client 100 and may be a network drive or network attached storage. The distant storage 110 may be part of a computer or other consumer electronic device (e.g., home entertainment system) that is part of a network that the client 100 may be connected to. The network may be a local area network (LAN) that includes multiple consumer electronic devices (CEDs) some of which are portable (clients) and some of which are stationary. The network may be wireless, wired, or some combination thereof. The network may be contained where a user would typically locate their CEDs (e.g., household).

The size restrictions of the client 100 and the cost of NVM (which may be greater than HDD) may be make it impractical/cost prohibitive for a user to maintain their entire dataset (e.g., pictures, songs, videos, files) on the client 100. Accordingly, a user may utilize distant storage 110 for storing their dataset. The user may only store a subset of the entire dataset at any given time on the client 100 and may store the entire dataset (superset) on the distant storage 110. The distant storage 110 may contain a dedicated region for storing the superset (associated with the client 100). Modification of this region may be limited to the client 100 (not shared with other clients). The superset may be stored in the distant storage 110 to ensure that the entire dataset is always maintained (data permanence) and is available to the client 100 when the client 100 is connected to the distant storage 110. The entire dataset may be stored on the distant storage 110 using the same directory/file structure as used on the client 100. The client 100 may control the copying of the content to the distant storage 110. No action is required by the distant storage 110 or the CED the distant storage 110 is located in (the distant storage 110 simply stores the content). Furthermore, a server is not required to manage the memory allocation between the client 100 and the distant storage 110.

As illustrated, the client 100 includes a subset of the dataset (A, B, a, b) and the distant storage 110 (dedicated region) includes the entire dataset (A, B, C, a, b, c), where large letters represent directories and small letters represent files. The directory/file structure is the presentation of the files within the directories they are associated with. Directories may not actually be physical locations in memory and the files within those directories need not actually be stored in a specific location allocated to the directory. Rather, the files in memory may be associated with a certain directory and a directory/file program creates a directory/file structure based thereon for presentation to a user and/or programs. It should be noted that the directory/file structure is illustrated as a tree for ease of understanding but is not limited thereto. Rather, the directory/file structure may be presented in any number of ways including folders and subfolders.

When the client 100 is connected to and has access to the distant storage 110 (connected operation), the client 100 has access to the data contained on the distant storage 110. The client 100 may utilize a directory/file aggregating program to generate a single merged directory/file structure (single merged view) 120 of the content stored within the client 100 and the distance storage 110. The directory/file aggregating program may merge the directory/file structures of the client 100 and the distant storage 110 so that files that are contained on both the client 100 and the distant storage 110 (overlapping content) are only presented once in the single merged view 120. The single merged view 120 may only display the file that can be accessed with the greatest performance (e.g., fastest). Since retrieving content from the client (local storage) 100 is often going to have better performance than retrieving content from distant storage 110, when content is included in both the storage on the client 100 and the distant storage 110 the content from the client 100 is presented while the content from the distant storage 110 is merged. Accordingly, the single merged view 120 may be of a directory/file structure that does not actually exist since the directories/files presented as being from a single location (drive) are from multiple locations (client 100, distance storage 110).

The single merged view 120 may be presented to the user of the client 100 or any of the applications running thereon. The user of the client 100 may remain generally unaware of the storage hierarchy in place. If a user or application selects content from the single merged view 120 that is only contained in the distant storage 110 the client 100 will retrieve the content from the distant storage 110 over the network. If content from the single merged view 120 is selected that is contained on the client 100 and the distant storage 110 the content will be retrieved from only one location (e.g., from the client 100 since that would likely be the most efficient).

If the content retrieved is modified, the modified content will need to be copied to all occurrences of the content (client 100, hard drive 110) not just the location it was retrieved from in order to ensure the content in each of the devices is the same (coherence). If new content is stored on the client 100 the content may be copied to the distant storage 110 to ensure the superset is maintained (permanence). The copying may be done by the user or may preferably be automatically done by the client 100 so no action is required on the part of the user to ensure the superset is maintained on the distant storage 110.

Since the client 100 may be removed from the network, the content that is contained locally on the client 100 (or alternatively the content that is only stored remotely) may be identified in some fashion in the single merged view 120 so that the user knows what content they will have access to when they disconnect from the network. This may be beneficial so that a user can ensure they have the content they desire on the client 100 when they know they are disconnecting from the distant storage 110. For example, if a user is going on a trip they can ensure that certain songs they want are contained on the client 100.

The content that is available on the client 100 is illustrated in bold in the single merged view 120. The single merged view 120 for connected operations is not limited to any particular identification scheme. The identification scheme may be standard or may be user configurable.

Content only stored on the distant storage 110 will only be available to the client 100 in connected operation. Accordingly, users may want to keep the client (local storage) 100 full so as to maximize both performance and the data available in disconnected operation. The content that is maintained on the client 100 may be selected by the user. The content may be automatically selected by the client 100 based on various parameters leaned by the client 100 (heuristics), including but not limited to, data retrieval performance delta between the client 100 and the distant storage 110, likelihood of accessing content, availability of distant storage 110, cost to network of fetching content from the distant storage 110, reliability of client 100 (e.g., may local content be lost), most often used, most recently used, particular type of content, and data retrieval performance requirements. The type of parameters learned (heuristics) by the client 100 may be defined by the user or may be suggested by the client 100.

When the client 100 is not connected to or can not access the distant storage 110 (disconnected operation) the user will not have access to the content of the distant storage 110 and will only have access to the data stored on the client 100. The distant storage 110 may become inaccessible when, for example, the distant storage (e.g., a USB drive) 110 is unplugged from the client 100 or the network connecting the client 100 to the distant storage 110 is not available (e.g., network down, client 100 disconnected from network, client 100 out of range of network).

The single merged view 120 may include the content that is not currently accessible to the client 100 in disconnected operation but which will be accessible when the client 100 reconnects with the distant storage 110 (know the content is available but can not access it). The single merged view 120 may distinguish in some fashion the currently available content from the not currently available content. Knowing the content that is stored in but not currently available from the distant storage 110 may be beneficial. For example, if a user is interested in obtaining what they believe to be a new song (not contained on the client 100) the single merged view 120 may illustrate to them that they already have a copy stored on the distant storage 110 and therefore need not obtain (e.g., purchase) it.

Figure 1B:
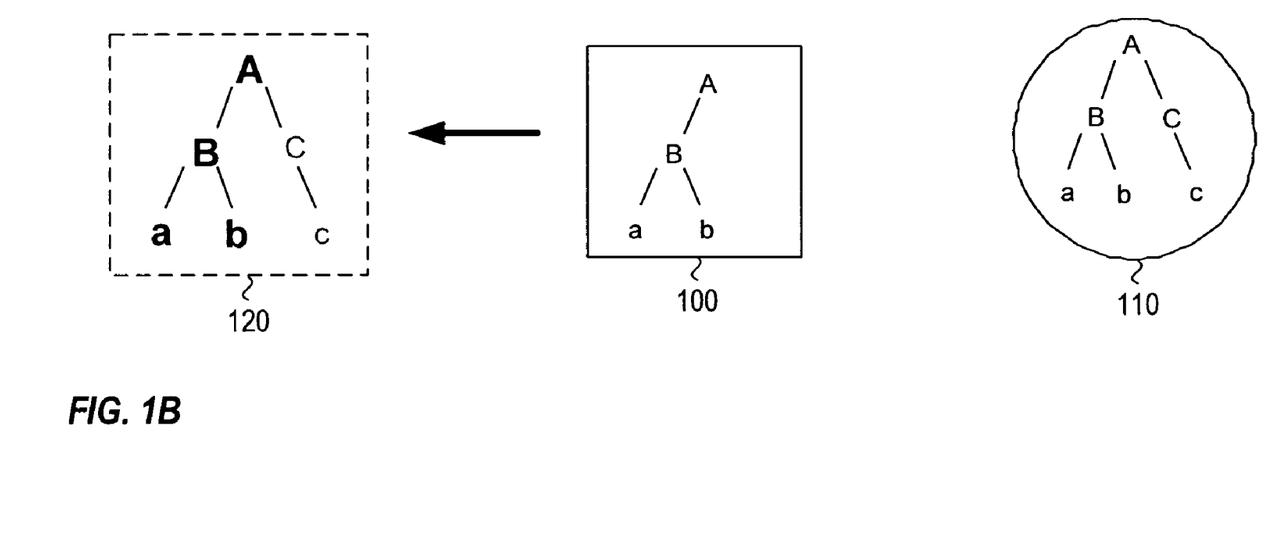
FIG. 1B illustrates an example disconnecting of the client from the distant storage, according to one embodiment.

FIG. 1B illustrates an example disconnecting of the client 100 from the distant storage 110. The single merged view 120 includes the content from the client 100 and the content from the distant storage 110 that is not currently available on the client 100. At this point (prior to any changes to the client 100) the single merged view 120 is much like the single merged view 120 when the client 100 was connected to the distant storage 110 (see FIG. 1A). The content that is not currently available (C, c) is illustrated in a gray color to indicate it is not available. The single merged view 120 for disconnected operations is not limited to any particular identification scheme. The identification scheme may be standard or may be user configurable.

When the client 100 is disconnected from the distant storage 110 a user may want to store additional content on the client 100. If the client 100 has the storage space the user may simply add the content thereto. However, if the client 100 does not have sufficient space, content will need to be discarded from the client 100 first. Content can be discarded from the client 100 without loosing the content since the content is also stored on the distant storage 110 (the content is not deleted from the distant storage 110). The content discarded from the client 100 may be selected by the user or may automatically be chosen by the client 100 based on heuristics (e.g., least often used, least recently used, particular type of content). The heuristics used may be defined by the user or may be suggested by the client 100. Content on the client 100 may also be modified while disconnected.

When the client 100 has content added, deleted and/or modified the single merged view 120 may reflect the changes. The added content may be added to the single merged view 120 and may be marked in some fashion to indicate that the content is not yet available on the distant storage 110. The content deleted may be marked as not being available on the client 100. The content modified may be identified in some fashion to indicate that the current version is not available on the distant storage 110.

Figure 1C:
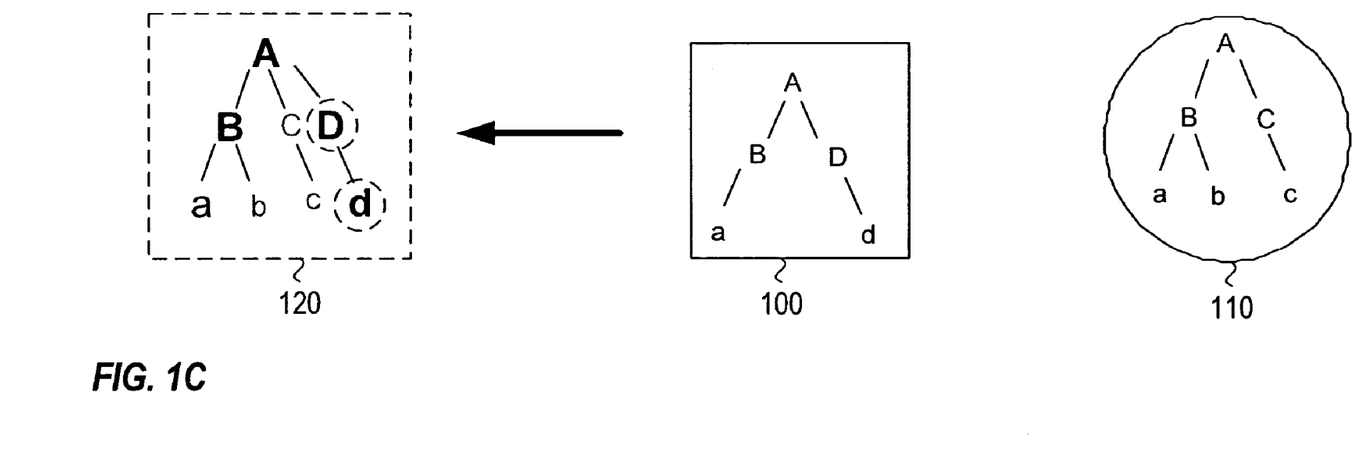
FIG. 1C illustrates an example modification of the content stored on the client during disconnected operations, according to one embodiment.

FIG. 1C illustrates an example modification of the content stored on the client 100 during disconnected operations (the illustrated modification includes deleting content (b) and adding content (D, d)). The single merged view 120 displays the new content that was added (D, d are now included in the single merged view 120). The single merged view 120 may also identify the content that was deleted (b is illustrated in gray). Since the content added is not yet available on the distant storage 110 the single merged view 120 may want to indicate that to the user so that the user does not inadvertently delete this content prior to the content being copied to the distant storage 110. The content only contained on the client 100 is illustrated in the single merged view 120 as having a dotted circle to indicate it has not yet been copied to the distant storage 110. The single merged view 120 for disconnected/modified content is not limited to any particular identification scheme. The identification scheme may be standard or may be user configurable.

When the client 100 is reconnected to the distant storage 110, the content on the distant storage 110 will be available to the client 100 without the need for any syncing of the devices. Accordingly, the single merged view 120 may be modified to indicate that the content available only on the distant storage 110 is now available to the client 100. The new content on the client 100 may be copied to the distant storage 110. Any modified content may be copied to the distant storage 110 to replace previous versions thereof. The copying may be done by the user or may preferably be automatically done by the client 100 so no action is required on the part of the user to ensure the superset is maintained on the distant storage 110. The client 100 may maintain a listing of the additions and/or modifications made while disconnected and automatically copy the new/modified content to the distant storage 110 upon reconnecting thereto. The automatic copying may copy the files to the distant storage 110 based on heuristics (e.g., files organized by date, directories organized by type of content). The heuristics used may be defined by the user or may be suggested by the client 100.

Figure 1D:
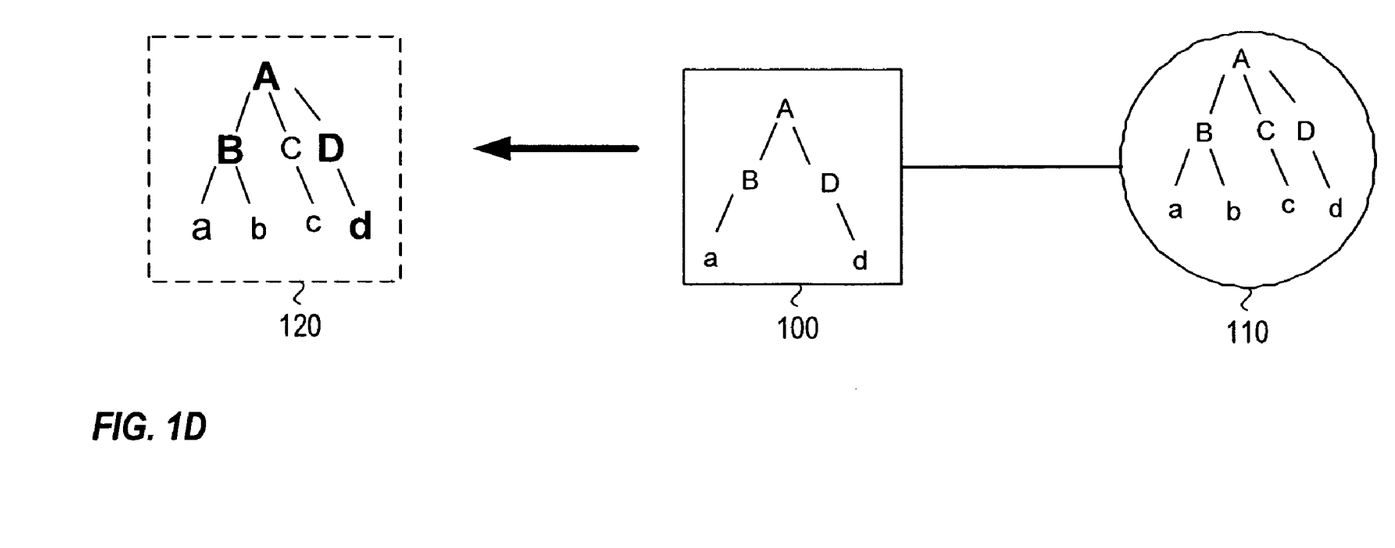
FIG. 1D illustrates an example reconnecting of the client and the distant storage after content on the client was modified, according to one embodiment.

FIG. 1D illustrates an example reconnecting of the client 100 and the distant storage 110 after content on the client 100 was modified. As the client 100 has access to the content on the distant storage 110 the single merged view 120 is modified to indicate this (as illustrated the gray color is replaced with black for b, C, c). Once the client 100 copies the newly added files from the client 100 to the distant storage 110 the single merged view 120 is modified to reflect that the content is not solely located on the client 100 (as illustrated the dotted circle is removed). As illustrated, the content available from both the client 100 and the distant storage 110 is displayed in the single merged view 120 as bold and the content that is available only on the distant storage 110 is displayed normally. The single merged view 120 for disconnected/modified content is not limited to any particular identification scheme. The identification scheme may be standard or may be user configurable.

FIGS. 1A-1D illustrate using distant storage 110 (e.g., HDD) to store users content since storing all content on the client 100 (e.g., NVM) may be impractical. The distant storage 110 contains a superset of the content so that the content is always available even if the client 100 must delete content at some point due to storage considerations or if the client 100 is lost. The single merged view 120 indicates the content that is available to the user in each of the configurations (connected, disconnected, modified content). Content is copied from the client 100 (local storage) to the distant storage 110 and certain content (e.g., infrequently used files) are purged from the client 100 to increase performance. Writes to the client 100 are driven back to distant storage 110 to keep the distant storage 110 up to date.

In order to store the superset of user content for the client 100 a large amount of storage (e.g., HDD) is required. As the distant storage 110 utilized to store the superset is not likely dedicated memory but rather a set aside percentage of memory from other devices within the location (e.g., residence) it is possible that no one device can store the superset. That is, a central storage point capable of storing all the files/media is unlikely in many homes where storage isn't planned, but rather introduced with each new purchase. Accordingly, multiple distant storage devices 110 may be utilized (as a single virtual drive) to store the superset of data for the client 100. The single merged view 120 allows the user to see all of the data in a single directory/file view so that the user need not worry about the storage hierarchy. For further protection the content may be stored on multiple distant storage devices 110 for redundancy. That is, if any one distant storage device 110 is not available the data is available over some other subset of distant storage devices 110.

Figure 2A:
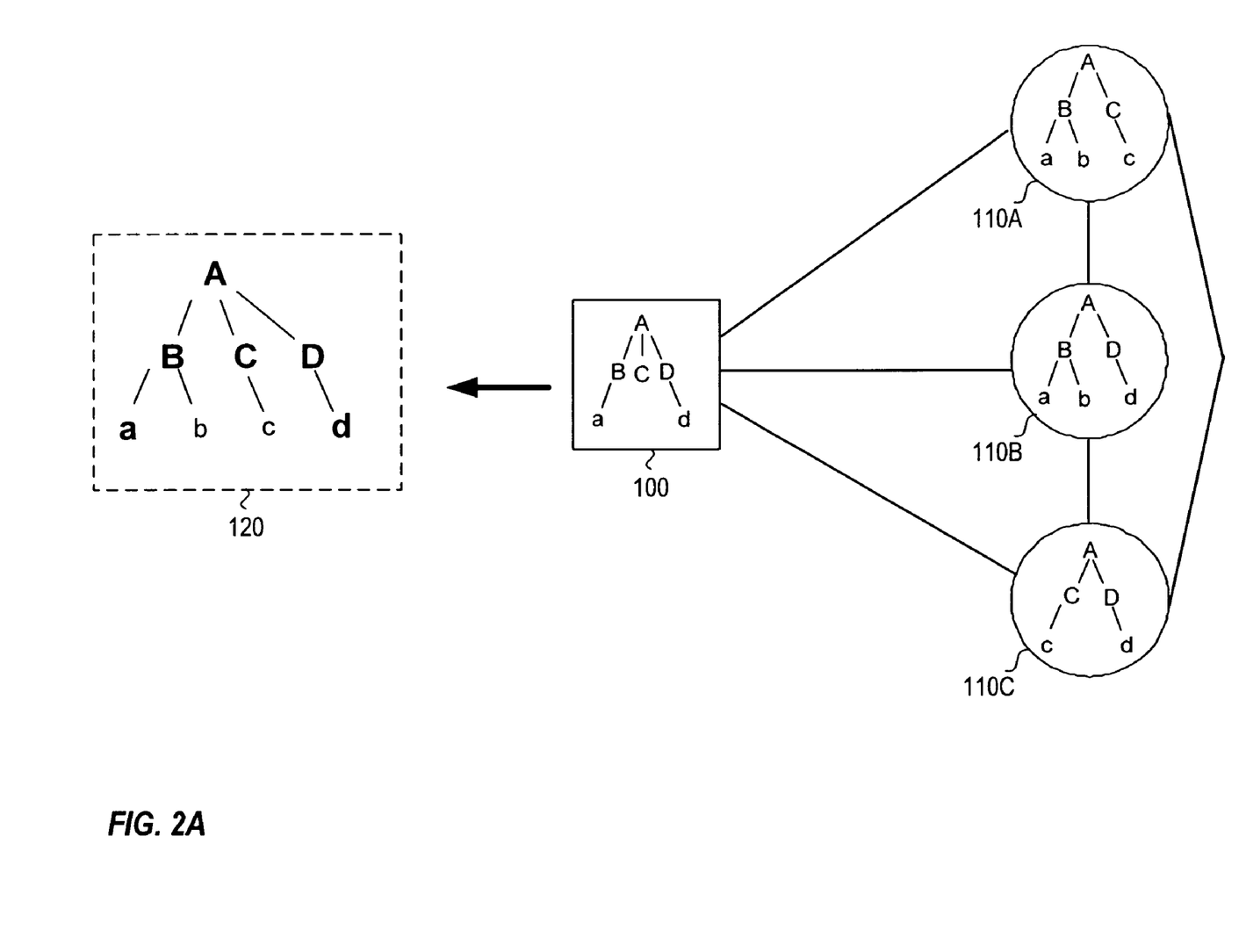
FIG. 2A illustrates an example communication between a client and multiple distant storage devices, according to one embodiment.

FIG. 2A illustrates an example communication between a client 100 and multiple distant storage devices 110A-C. The storage of the superset may be distributed across the multiple distant storage devices 110A-C. The user may determine where to copy the content for storage (which distant storage device 110A-C to store the content on). Preferably the content is copied for storage automatically by the client 100 without the need for action by the user to ensure the superset is maintained. For example, the client 100 may determine where to copy and store the data based on heuristics (e.g., most secure storage, fastest retrieval, most space). The heuristics used may be defined by the user or may be suggested by the client 100.

The content may be stored on the distant storage 110A-C in more then one location to provide redundancy. The client 100 may copy the content to multiple locations. Alternatively, the client 100 may copy the content to one location and the content may be copied to another location for redundancy based on network rules. As illustrated, directory B and files b and c are stored on both distant storage 110A and 110B, directory C and file c is stored on both distant storage 110A and 110C, and directory D and file d is stored on both distant storage 110B and 110C. The redundancy enables a distant storage 110 to be removed or deactivated and to not lose access to any of the superset. For example, if distant storage 110C was removed directory C and file c would still be available on distant storage 110A and directory D and file d would still be available on distant storage 110B.

The movement of data between local storage (within the client 100) and distant storage 110A-C is handled automatically by the client 100. The movement of content between network storage 110A-C (e.g., to create redundant copies of content) may be performed by the network or a computer acting as a network storage system. No central server is required for storing the superset in distant storage 110, distributing the storage of the superset across several distant storage deices 110A-C, or creating the redundant copies. Existing file systems and network storage protocols as well as existing applications may be utilized. Heuristics may govern the movement and replication of files between the storage resources.

The client 100 may aggregate and merge the directory/files for each distant storage 110A-C to create a single aggregated directory/file image (single aggregated view). The redundant distribution of the superset enables a single distant storage device 110A-C to be lost without affecting the single aggregated view since the contents would be contained on another distant storage device 110A-C. The single aggregated view may be merged with the directory/files on the client 100 to create the single merged view 120. The single merged view 120 may identify data available (or not available) on the client 100 in some fashion so that a user would know what data was contained locally. As illustrated, the data contained on the client 100 is bold on the single merged view 120. The single merged view 120 is not limited to any particular identification scheme and may be standard or may be user configurable.

It should be noted that as illustrated in FIG. 2A all the distant storage 110A-C are networked together (in communication with one another). However, the distant storage devices 110A-C need not communicate with one another. For example, one of the distant storage devices 110 may be a USB drive that is only connected to and accessible by the client 100.

When the client 100 is removed from the distant storage 110A-C the single merged view 120 may continued to be displayed (e.g., like in FIG. 1B), the client 100 may discard content, store additional content, and/or modify content (e.g., like in FIG. 1C) and the distant storage 110A-C may be updated to capture new/modified content upon reconnection to the distant storage 110A-C (e.g., like in FIG. 1D).

It is possible that the client 100 may not be connected to all of the distant storage devices 110A-C and therefore not be capable of generating the single aggregated view. It is also possible that the client 100 may only be capable of merging directory/files and not aggregating them. Accordingly, a device (e.g., computer, router) may be utilized to create the single aggregated view for the plurality of distant storage devices 110A-C and share the single aggregated view with the client 100.

Figure 2B:
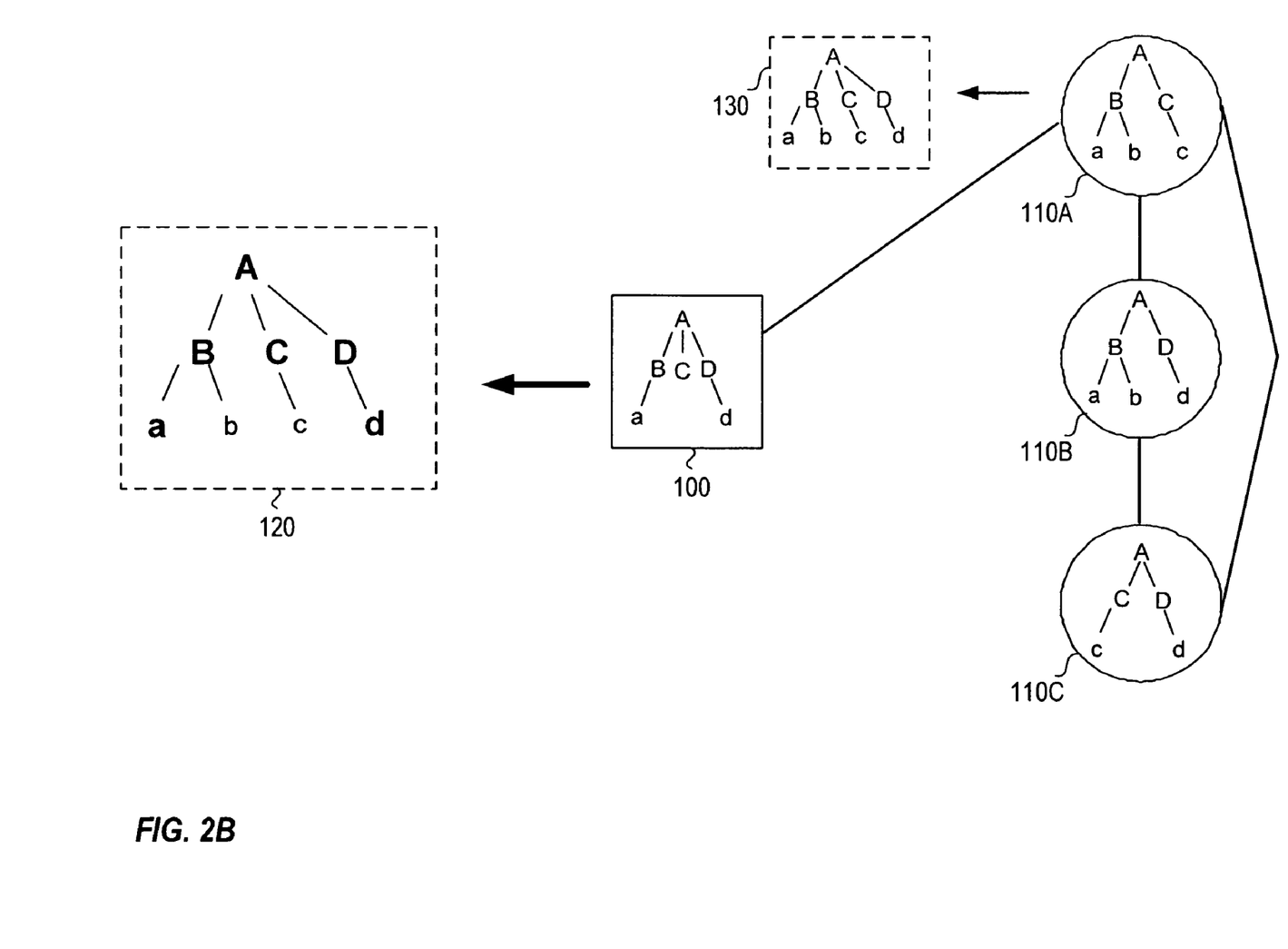
FIG. 2B illustrates an example communication between a client and multiple distant storage devices through a single device, according to one embodiment.

FIG. 2B illustrates an example communication between a client 100 and multiple distant storage devices 110A-C through a single device (e.g., computer, router). The device may or may not include storage for the client 100 (illustrated as including distant storage device 110A). The device may create a single aggregated view 130 for the superset maintained over the distant storage devices 110A-C. The device may present the single aggregated view 130 to the client 100 over the network (may also present it to other devices on the network). As far as the client 100 is aware the single aggregated view 130 is maintained only in distant storage device 110A (it is unaware of distant storage devices 110B-C). The client 100 may merge the single aggregated view 130 with the directory/files on the client 100 to create a single merged view 120. When content is added to (or modified on) the client 100, the client 100 may copy the content to the distant storage device 110A and the distant storage device 110A may determine where the content should be stored amongst the multiple distant storage devices 110A-C.

The use of distant storage 110 to store a superset of content for a client 100 may be expanded to multiple clients 100, where the superset is the content from the multiple clients 100. The clients 100 may be associated with the same user (e.g., laptop computer, PDA, digital camera) or may be associated with different users that agree to share access to each others content (or at least portions of each others content) by creating a superset that includes content from each users client 100, where the superset is accessible to others.

Figure 3:
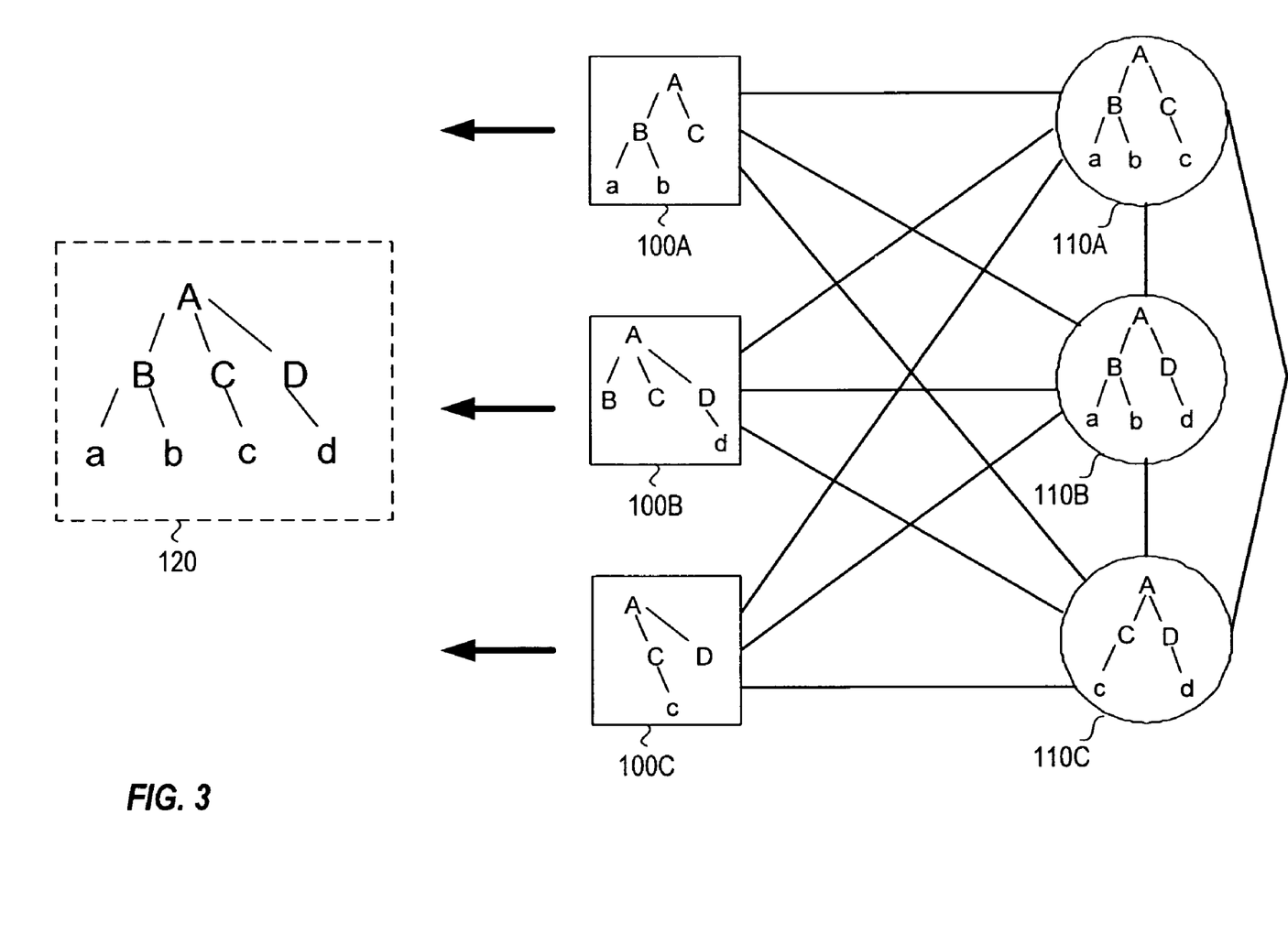
FIG. 3 illustrates an example communication between multiple clients and multiple distant storage devices, according to one embodiment.

FIG. 3 illustrates an example communication between multiple clients 100A-C and multiple distant storage devices 110A-C. Each of the clients 100A-C may have access to the superset of content and contribute content to the superset. The content copied to the distributed storage may be controlled by the clients 100A-C. The superset may be stored in multiple distant storage devices 110A-C for redundancy. If the same content was included in multiple clients 100A-C the content from only a single client 100 need be copied to the distant storage (may be copied to dual locations for redundancy). The detection of duplicates may be performed by the clients 100A-C, or by a network storage device. In order to generate the single merged view 120, the clients 100A-C may create the single aggregated view for the superset maintained over the distant storage devices and then merge the single aggregated view with the directory/files maintained in the client 100A-C.

Since the superset is maintained in the distant storage devices 110A-C, when the clients 100A-C create the single aggregated view it should be the same for each. One of the challenges is with different files that have the same name. That can be handled by renaming one of the files when the merge takes place. For 100A-C to have the same view, they will all have to follow the same merge algorithm, including things like renaming existing files when there is a name collision. Since the content on each client 100A-C may be different, when the single aggregated view is merged view with the directory/files maintained in the clients 100A-C the single merged views 120 created for each client 100A-C may be different based on the identification of which content is stored locally.

The discussion of FIG. 3 focused on each client 100A-C creating its own single aggregated view. However, it is possible that a network device may create the single aggregated view and share it across the network (e.g., 110A, 130 of FIG. 2B) or that one client may create the single aggregated view and share it over the network. It is also possible that some of the clients get the single aggregated view over the network and that others create it.

The use of the distant storage 110 to store a superset of content expands the capacity of devices using NVM. The single merged view 120 provides users an easy view of what content is available to them without regard to the location of the content. The single merged view 120 also identifies what content will not be available if the client 110 is removed from the network or what content will be available when the client 100 is returned to the network. The single merged view 120 provides users with access to data and media stored across different storage devices within the home from any PC or CED within the home and organizes the content for them, in a consistent manner across the home.

Figure 4:
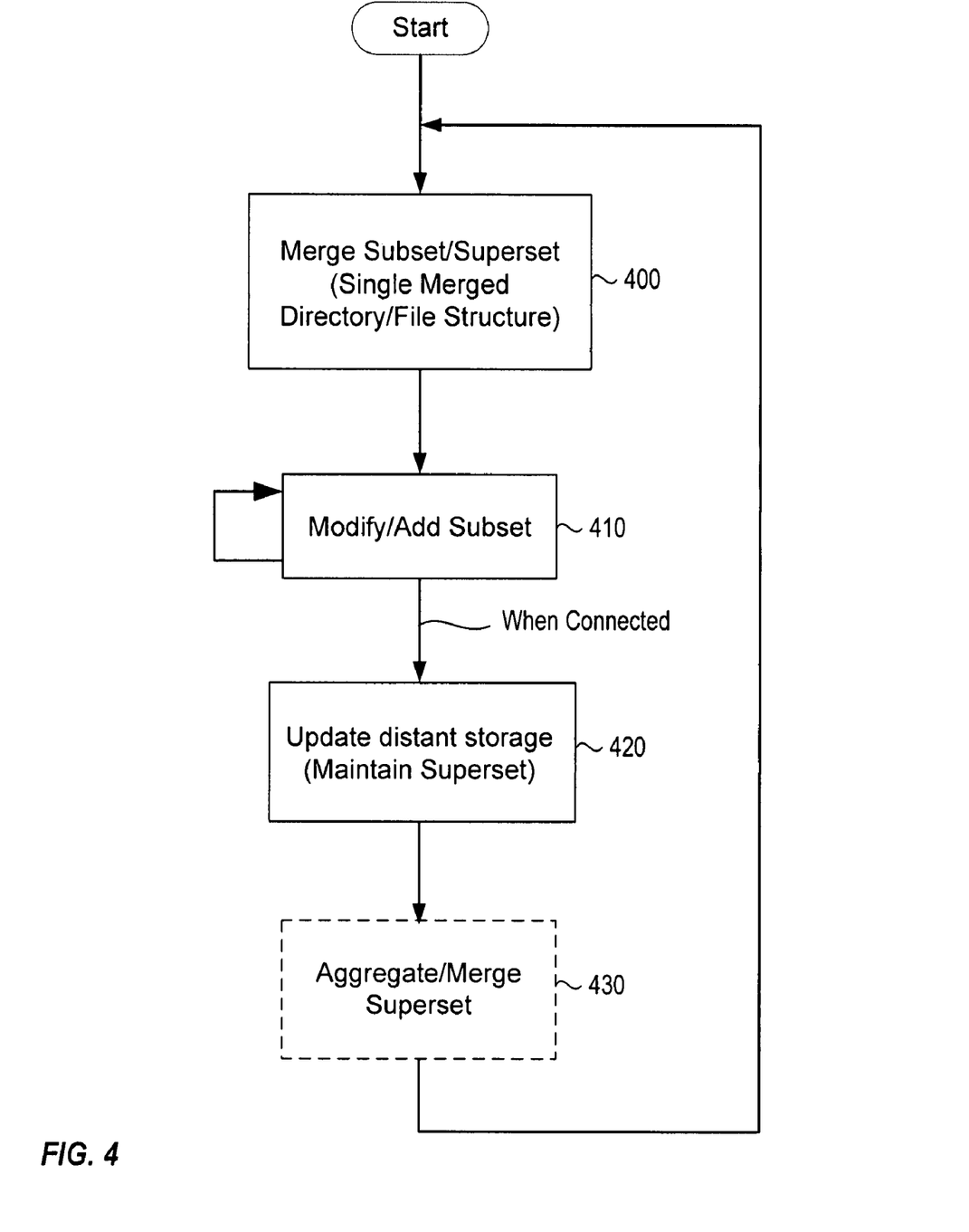
FIG. 4 illustrates an example high level flow for the client creating the single merged view from the subset stored on the client and the superset stored in distant storage, according to one embodiment.

FIG. 4 illustrates an example high level flow for the client creating the single merged view from the subset stored on the client and the superset stored in distant storage. Prior to starting it is assumed that a user of a client having limited storage (NVM) maintains a subset of their content on the client and a superset of the content on distant storage (HDD). Maintaining the superset enables all content to be available to the client even though the client can not maintain all the content thereon. It should be noted that the user may have a plurality of clients or multiple users may have clients that wish to maintain their contents as part of a single superset. It should also be noted that the distant storage may be a plurality of distant storage devices coupled to the client. The distant storage devices may be networked together.

When the client is connected to the distant storage the client merges the file/directory structure of the superset (from distant storage) with the directory/file structure of the subset (from the client) to create a single merged view of the content available to the client 400. The single view may indicate content that is available if the client is removed from the distant storage (content on the client). The user may add new content or modify existing content on the client (modify the subset) 410. When the client is connected to (in communication with) the distant storage the client updates the distant storage by copying any new or modified data to the distant storage to maintain the superset 420. Once the superset is updated the single merged directory view needs to be updated to reflect the changes. When multiple distant storage devices are used to store the superset, the directory/files structures for all the distant storage devices containing content are aggregated and merged to create a single aggregated view of the superset 430. The aggregation/merging may be performed by the client or may be performed by a device (e.g., computer) networked to the distant storage devices. It should be noted that if the superset of content is stored in a single distant storage device this step may not be required. The file/directory of the superset (either actual or aggregated view) is then merged with directory/file structure of the subset to create the single merged view of the content available to the client 400.

The directory/file structure presents the files based on location of the files within directories. This limits the way that data can be presented to and searched by a user or accessed by various programs used by the user. Directory/file aggregating programs may generate virtual directory structures that organize the files in different ways (based on different parameters of the content) for the user to view and search and for programs to access. The creation of the virtual file/directory structures may intuitively make sense to the end user and programs utilized by the user. The virtual directories may be generated by taking the contents of the files, the metadata associated with the files, and the original directory structures into account. The virtual directory/file structures may be presented to the user and programs but are not actually stored in memory (e.g., on disk) and do not reside in a file system. While not real directory/file structures the virtual directory/file structures appear as regular directory/file structures to a user and programs.

Figure 5A:
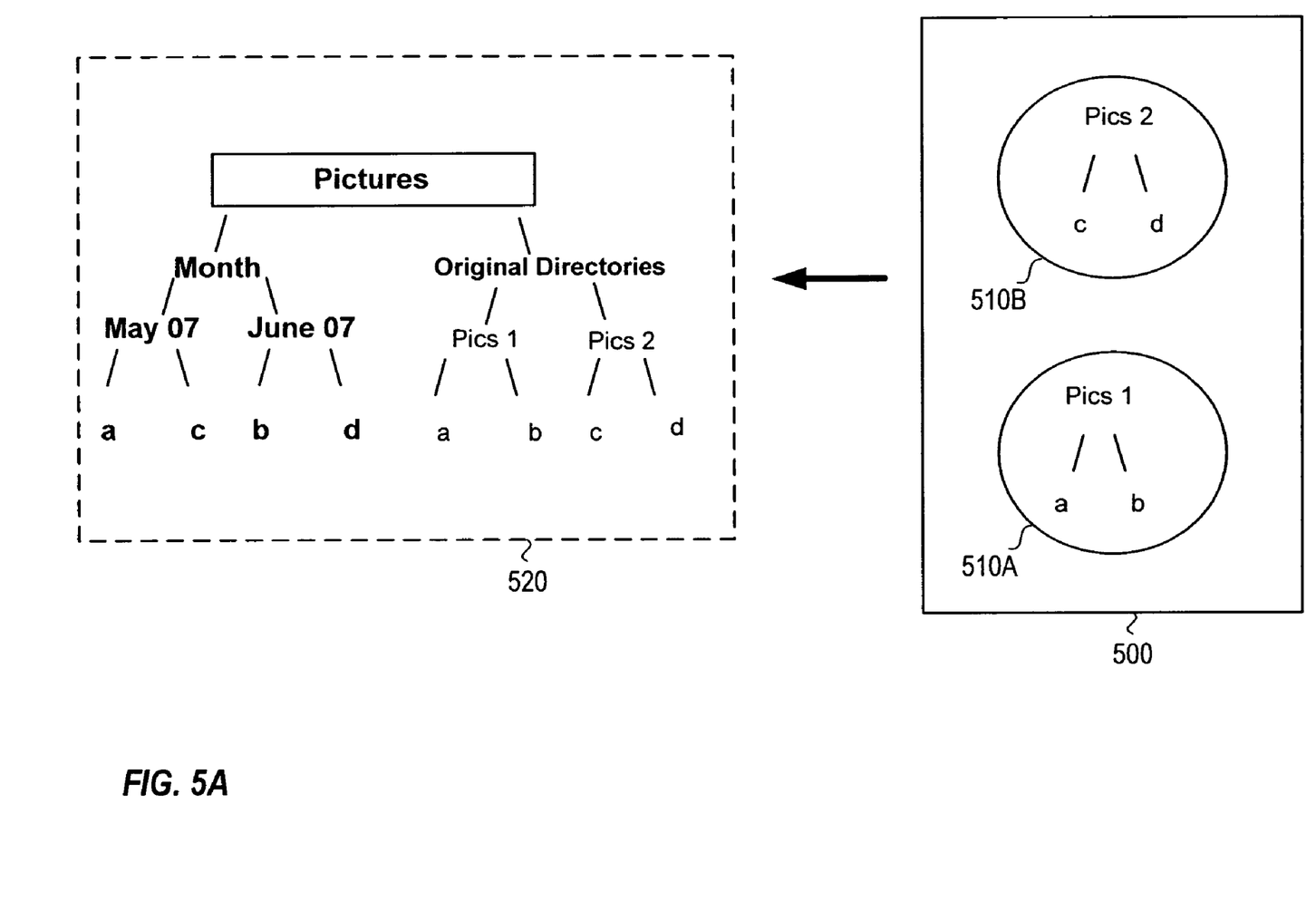
FIG. 5A illustrates an example of a virtual directory created based on content stored locally on a device, according to one embodiment.

FIG. 5A illustrates an example of a virtual directory/file structure (tree) created based on content stored in local memory 500 of a device. The device may be a portable device (e.g., laptop computer, PDA) or may be a stationary device (e.g., computer, CED). The local memory 500 (e.g., HDD, NVM) includes a user's dataset. The dataset includes pictures that are stored in two directories (Pics 1, Pics 2) 510A, 510B with pictures a and b in the Pics 1 directory 510A and pictures c and d in the Pics 2 directory 510B. A directory/file aggregating program running on the device may create a single aggregated directory/file structure (single actual view) by aggregating the local directory/file structures 510A, 510B. The local directory/file structures 510A, 510B may be aggregated based on some parameter associated with the directories (e.g., content). In addition, the aggregating program may create virtual directory/file structures (virtual views) from the single actual view based on other parameters (e.g., date) associated with the content. Furthermore, the aggregating program may create a unified directory/file structure 520 (unified view) that presents the single actual view and the virtual views.

As illustrated, the unified view 520 is grouped under a content (pictures) virtual directory and has an actual view branch and a virtual view branch. The actual view branch is grouped under a virtual directory (original) that includes the actual directories (Pics 1, Pics 2) and content (a, b, c, d) following the directory/file structure used to save the data. The virtual view branch is grouped by the distinguishing parameter (month) and has multiple subdirectories based on different instances (May 07, June 07) of the distinguishing parameter. The files appear in the appropriate virtual directory based on parameters about the content determined by looking at the content and/or metadata. As illustrated, file a that was in the Pics 1 directory and file c that was in the Pics 2 directory appear in the May 07 virtual directory and file b that was in the Pics 1 directory and file d that was in the Pics 2 directory appear in the June 07 virtual directory. The files may have been placed in these directories by detecting the date the pictures were taken (or the date the pictures were downloaded into storage) from the metadata associated with the pictures. The virtual directories created in FIG. 5 are illustrated as being bold.

Various types of data, including but not limited to, the content itself (e.g., tags contained in the content), data within the content, and metadata associated with the content may be utilized to organize content by different parameters and create the virtual directory/file structures therefore. By using the content and metadata, virtual directory/file structures which are more meaningful to users can be created.

The unified view 520 and the various virtual views included therein are generated by the aggregating program and are not actually created and stored in the memory 500. This saves disk space and time by avoiding the writing of directories to the disk, a slow process. Since view creation is fast and takes no disk space, many views for one original dataset can be created. Creating virtual views enables the aggregating program to create as many views as the user may find helpful, in a manner not limited by disk size or file creation performance. Moreover, since the virtual views don't change the contents of the memory 500, a user who wishes to return to the single actual view or the original directory/file structured can do so since the memory 500 contents have not been changed (enables complete removal of virtual views).

The number and type of virtual views that can be created is rather expansive. The virtual views may be based on preferences and/or permissions specified by the user. The user may define that the type of virtual views they would like created. For example, the user may want virtual views created based on type of content (e.g., photos, music), date content was created (e.g., date picture taken). For specific types of content (e.g., music, movies) the user may want virtual views based on genre, artist, actors, and directors. The aggregating program may automatically create virtual views based on heuristics (e.g., content type, date, access frequency, file name) and may modify the virtual views presented based on what virtual views the user uses. The heuristics may be defined by the user or may be suggested by the aggregating program.

It should be noted that regardless of the number of virtual views presented only one copy of each file is required, rather than a copy for each view presented. The file remains in the original directory and is not copied to any virtual directories.

Figure 5B:
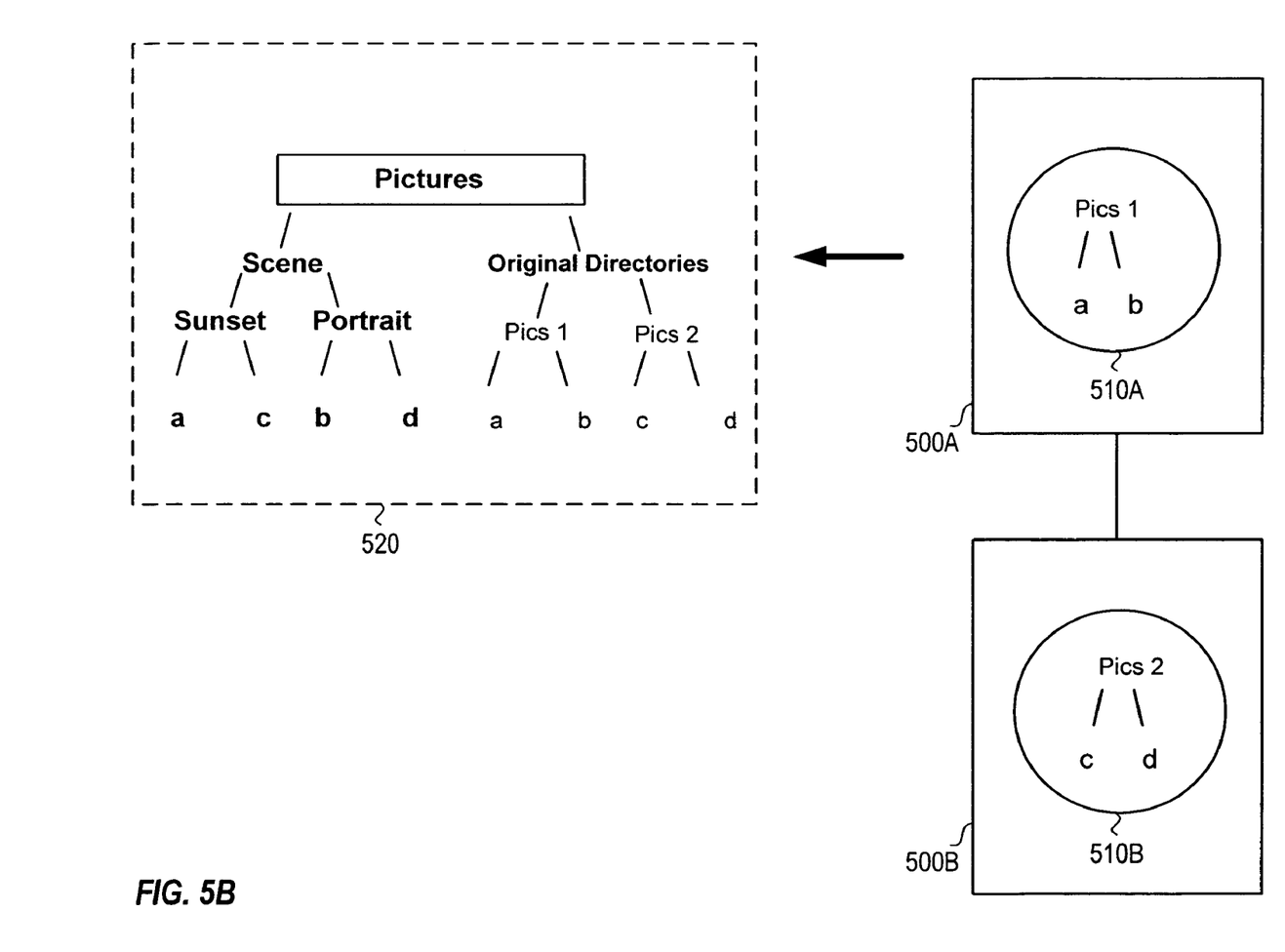
FIG. 5B illustrates an example of a virtual directory created based on content stored on various devices networked together, according to one embodiment.

FIG. 5B illustrates an example of a virtual directory/file structure created based on content stored on various devices networked together. A first device includes memory 500A containing a first directory 510A and a second device includes memory 500B containing a second directory 510B. The first and second devices are networked together. The aggregating program creates a unified view 520 by first aggregating the two networked directories 510A, 510B0 into a single merged directory/file structure (the user does not know the content is located on separate devices) and then creating the virtual views therefrom. As illustrated, a virtual directory branch is created based on the type of scene that is captured in the pictures and the two scene type subdirectories are sunsets and portraits. The scene virtual directory structure may be constructed based on content analysis of the underlying files (e.g., analyze tags in the photos to determine which are sunsets and which are portraits). The virtual directories created in FIG. 5B are illustrated as being bold.

As illustrated, the first device generated the unified directory/file view 520 by running the aggregating program. The unified directory/file view 520 may be shared over the network so that the second device and any other devices on the network have access thereto. Sharing the unified directory/file view 520 over the network provides the benefit of devices not capable of running an aggregating program being able to view the unified directory/file view 520. That is, it allows users to experience the same directory hierarchy and file location from any device within the home, or over the Internet.

Figure 6:
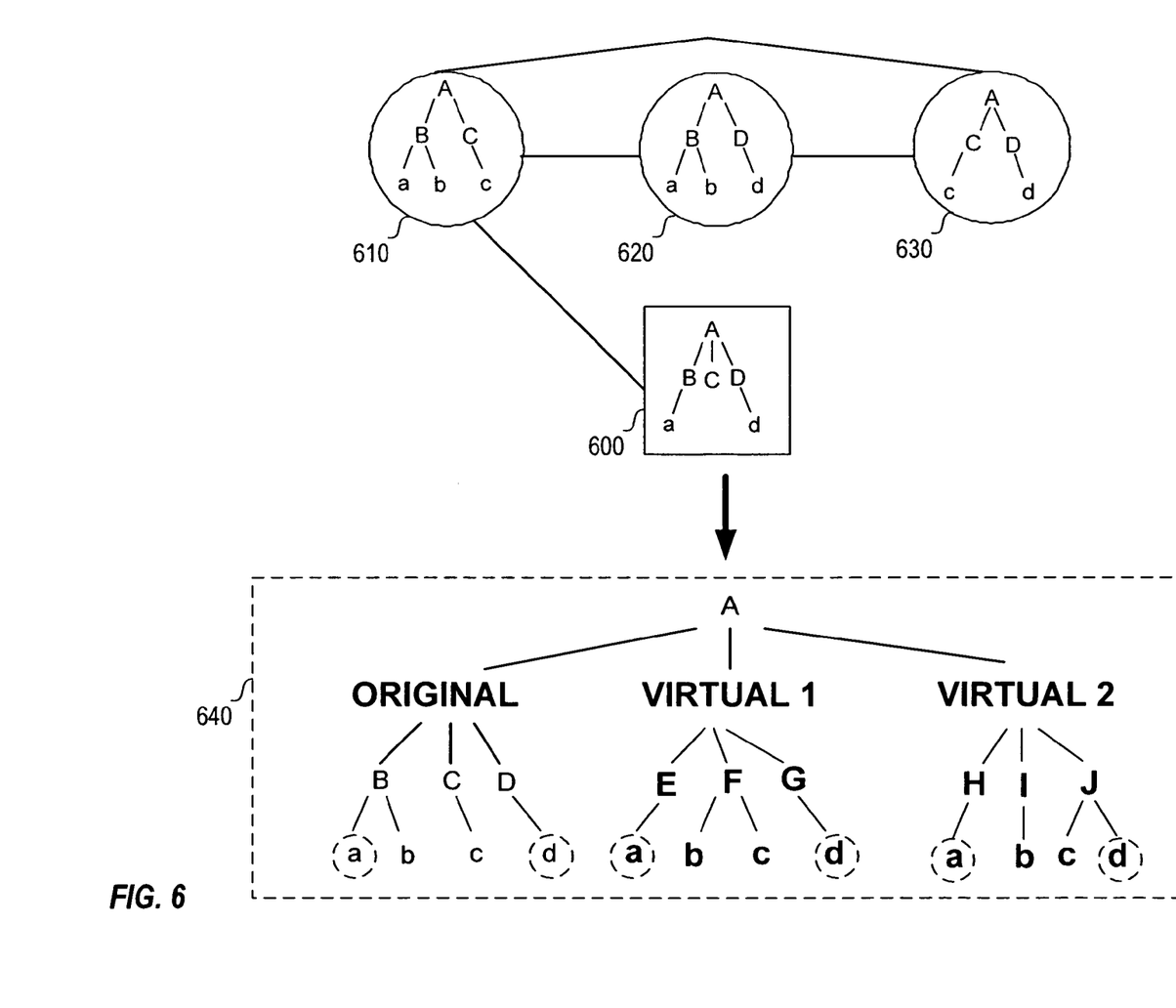
FIG. 6 illustrates a client having NVM connected to a network of devices each storing a portion of a superset of content accessible to the client, according to one embodiment.

FIG. 6 illustrates a client 600 having NVM connected to a network of devices containing distant storage (HDD) 610, 620, 630. The client 600 stores a subset of a users dataset and each distant storage device 610, 620, 630 stores a portion of a superset of the users dataset (accessible to the client 600). As illustrated, the client 600 is only connected to the device 610, so the device 610 aggregates the directory/file structures for each of the devices 610, 620, 630.

The device 610 may present the single aggregated directory/file structure (single aggregated view) to the client 600. The client 600 may generate several virtual views based thereon and then merge the virtual views and the single aggregated view to create a unified directory/file view 640. As part of the merge, the client 600 may indicate which files are stored locally and thus will be available if removed from the network. The files available locally are illustrated as being circled and the virtual directories as illustrated as being bold.

The device 610 may create the virtual views and aggregate the single view and virtual views into a unified view of the superset. The device 610 may present the superset unified view to the client 600. The client 600 may merge the superset unified view presented with the directory/file structure of the subset to create the unified directory/file view 640.

It should be noted that the client 600 may communicate with each of the devices 610, 620, 630 storing the superset and may aggregate the directory/file structures of each (rather then receiving from one of the devices 610). It should also be noted that multiple clients may communicate with the device(s) storing the superset of content. The virtual views may be presented to each of the clients or each of the clients may create its own. If each client has different preferences defined for the virtual views presented each of the clients may create a separate view. Furthermore, since each client likely has a different subset of the dataset stored therein, the merging with the subset directory/file structure will result in different unified views for each (different content identified as being stored locally).

The updating of the superset when new content is added to a client, the modification of data on the client and possible removal of data from the client would occur in the same or similar fashion to that described above (e.g., see FIGS. 1A-D).

Figure 7:
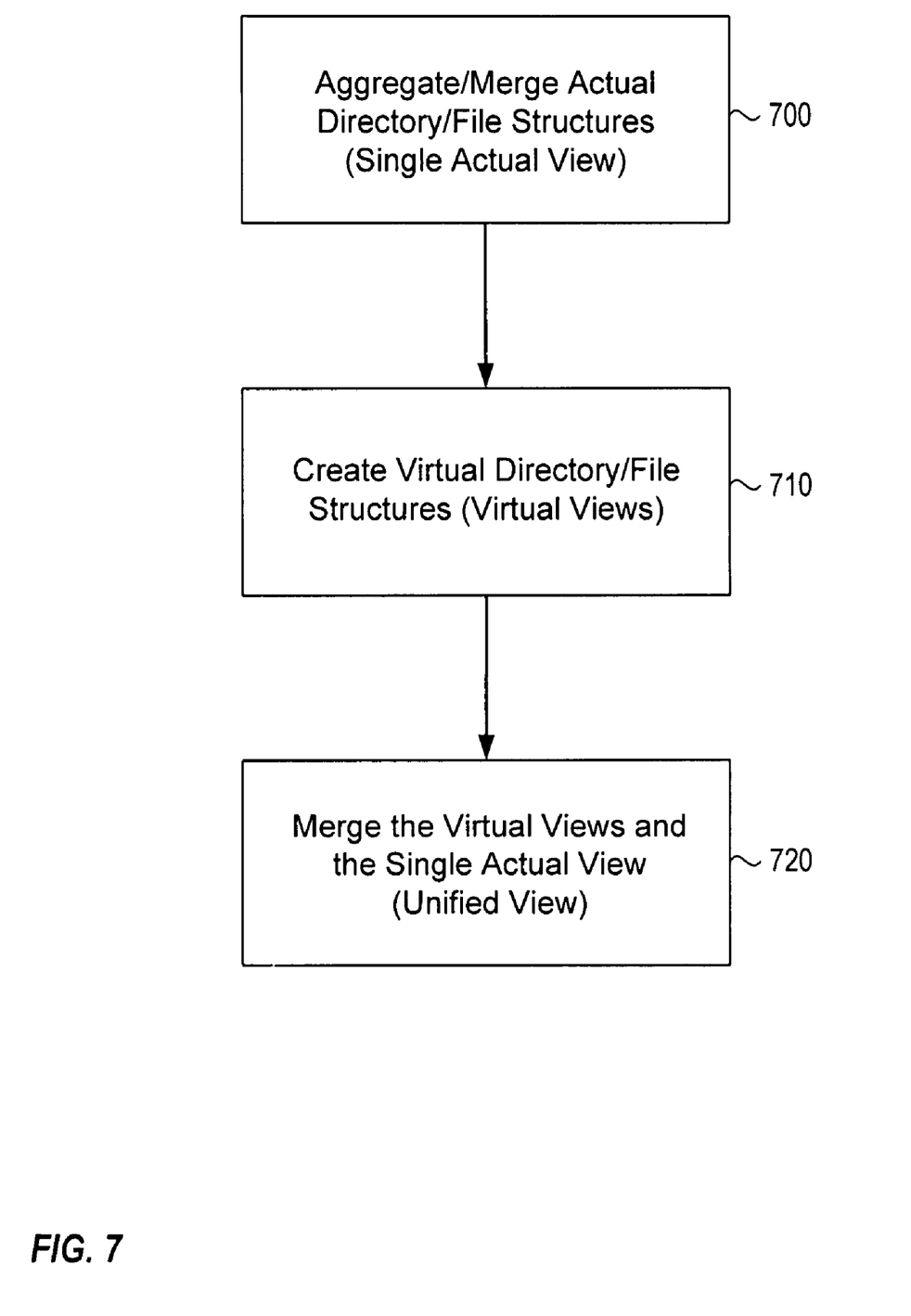
FIG. 7 illustrates an example high level flow for creating a unified view of contents that includes single actual views and virtual views, according to one embodiment.

FIG. 7 illustrates an example high level flow for creating a unified view of contents that includes single actual views and virtual views. Initially, a plurality of directory/file structures are aggregated and merged to create a single actual view 700. The plurality of directory/file structures may be located on a single device or may be distributed over a plurality of devices. Virtual view(s) are created for content within the single actual view 710. The virtual view(s) and the single actual view are merged to create a unified view 720.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

All or part of an embodiment may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

An embodiment may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various embodiments are intended to be protected broadly within the spirit and scope of the appended claims.

What is claimed is:

1. An apparatus comprising:
a processor;
a first interface to enable a user to obtain content;
a second interface to communicate with remote storage; and
a processor-readable storage medium to store the content and processor executable instructions, which when the processor executable instructions are executed by the processor cause the processor to:
create a first directory/file structure for the content obtained by the user and stored in the processor-readable storage medium;
as dictated by limited storage capability of the processor-readable storage medium, discard a portion of the content stored therein and only maintain a subset of the content as a first dataset, wherein the first dataset has a second directory/file structure that is a subset of the first directory/file structure;
when the apparatus and the remote storage are connected, copy the content not included in the remote storage from the processor-readable storage medium to the remote storage, wherein the remote storage simply stores the content based on instructions from the apparatus and does not require a server to manage memory allocation between the apparatus and the remote storage, wherein the remote storage maintains all content copied thereto as a second dataset, wherein the second dataset includes all content subsequently discarded from the processor-readable storage medium and not included in the first dataset, wherein the second dataset has a third directory/file structure, and wherein the third directory/file structure and the second directory/file structure overlap;
generate a single merged directory/file structure from the third directory/file structure and the second directory/file structure that merges portions of the third directory/file structure that overlap the second directory/file structure, wherein the single merged directory/file structure does not actually exist as the content presented as being from a single location is contained in the processor-readable storage medium and the remote storage; and
present the single merged directory/file structure to a user of the apparatus and applications running thereon.

2. The apparatus of claim 1, wherein when executed by the processor the processor executable instructions further cause the processor to identify on the single merged directory/file structure the first dataset that are available when the apparatus and the remote storage are not connected.

3. The apparatus of claim 1, wherein when executed by the processor the processor executable instructions further cause the processor to identify on the single merged directory/file structure a portion of the second dataset not included in the first dataset and not available to the apparatus when the apparatus and the remote storage are not connected.

4. The apparatus of claim 1, wherein when executed by the processor the processor executable instructions further cause the processor to delete a portion of the first dataset based on heuristics when additional storage is needed in the processor-readable storage medium for new content.

5. The apparatus of claim 4, wherein when executed by the processor the processor executable instructions further cause the processor to update the single merged directory/file structure to reflect the content added to and deleted from the first dataset.

6. The apparatus of claim 5, wherein when executed by the processor the processor executable instructions further cause the processor to identify on the single merged directory/file structure new content added to the first dataset that has not been copied to the remote storage and thus is not included in the second dataset.

7. The apparatus of claim 1, wherein when executed by the processor the processor executable instructions further cause the processor to copy content that was modified in the first dataset to the remote storage to overwrite the content in the second dataset with the modified content when the apparatus and the remote storage are connected.

8. The apparatus of claim 1, wherein when executed by the processor the processor executable instructions further cause the processor to adjust the content maintained in the first dataset based on heuristics when the apparatus and the remote storage are connected.

9. The apparatus of claim 1, wherein the remote storage includes a plurality of remote storage units and when executed by the processor the processor executable instructions cause the processor to copy the content not included in the plurality of remote storage units from the processor-readable storage medium to the plurality of remote storage units, wherein each of the plurality of remote storage units maintains a portion of the second dataset, and wherein each portion of the second dataset has an associated portion of the third directory/file structure.

10. The apparatus of claim 9, wherein when executed by the processor the processor executable instructions further cause the processor to generate the third directory/file structure by aggregating the portions of the third directory/file structure associated with each of the plurality of remote storage units, wherein the third directory/file structure does not actually exist as the content presented as being from a single location is contained over the plurality of remote storage units.

11. The apparatus of claim 9, wherein the content contained in the second dataset is redundantly maintained in the plurality of remote storage units, wherein the portions of the second dataset and the associated portion of the third directory/file structure in the plurality of remote storage units overlap, and wherein when executed by the processor the processor executable instructions further cause the processor to generate the third directory/file structure by aggregating the portions of the third directory/file structure associated with each of the plurality of remote storage units and merging overlapping portions, wherein the third directory/file structure does not actually exist as the content presented as being from a single location is contained over the plurality of remote storage units.

12. The apparatus of claim 1, wherein when executed by the processor the processor executable instructions further cause the processor to create a virtual directory/file structure for the second dataset based on parameters about the content rather than location of the content within directories as defined in the third directory/file structure, wherein the parameters about the content are obtained from some subset of the content, data within the content, metadata associated with the content, or files associated with the content.

13. The apparatus of claim 12, wherein when executed by the processor the processor executable instructions further cause the processor to aggregate the virtual directory/file structure and the single merged directory/file structure to create a unified directory/file structure.

14. A system comprising
a portable device having a processor, a user interface to obtain content, and a processor-readable storage medium to store content and processor executable instructions; and
remote storage connectable to the portable device,
wherein when the processor executable instructions are executed by the processor they cause the processor to:
create a first directory/file structure for the content obtained by the user and stored in the processor-readable storage medium;
when necessary based on limited storage capability of the processor-readable storage medium, delete a portion of the content stored therein and only maintain a subset of the content as a first dataset, wherein the first dataset has a second directory/file structure that is a subset of the first directory/file structure;
when the portable device and the remote storage are connected, copy the content not included in the remote storage from the processor-readable storage medium to the remote storage, wherein the remote storage simply stores the content based on instructions from the portable device and does not require a server to manage memory allocation between the portable device and the remote storage, wherein the remote storage maintains all content copied thereto as a second dataset, wherein the second dataset includes all content subsequently deleted from the processor-readable storage medium and not included in the first dataset, wherein the second dataset has a third directory/file structure, and wherein the third directory/file structure and the second directory/file structure overlap;
generate a single merged directory/file structure from the third directory/file structure and the second directory/file structure that merges portions of the third directory/file structure that overlap the second directory/file structure, wherein the single merged directory/file structure does not actually exist as the content presented as being from a single location is contained in the processor-readable storage medium and the remote storage; and
present the single merged directory/file structure on the user interface.

15. The system of claim 14, wherein the remote storage includes a plurality of networked storage units and when executed by the processor the processor executable instructions cause the processor to copy the content not included in the plurality of networked storage units from the processor-readable storage medium to the plurality of networked storage units, wherein each of the plurality of networked storage units maintains a portion of the second dataset, and wherein each portion of the second dataset has an associated portion of the third directory/file structure.

16. The system of claim 15, wherein the plurality of networked storage units are networked to a computer and the computer is to aggregate the portions of the third directory/file structure associated with each of the plurality of networked storage units and merge any overlaps in the portions of the third directory/file structure associated with each of the plurality of networked storage units to generate the third directory/file structure and share the third directory/file structure with the portable device, wherein the third directory/file structure does not actually exist as the content presented as being from a single location is contained over the plurality of networked storage units.

17. The system of claim 16, wherein when executed by the processor the processor executable instructions further cause the processor to create a virtual directory/file structure for the second dataset based on parameters about the content rather than location of the content within directories as defined in the third directory/file structure, wherein the parameters about the content are obtained from some subset of the content, data within the content, metadata associated with the content, or files associated with the content.

18. The system of claim 17, wherein when executed by the processor the processor executable instructions further cause the processor to aggregate the virtual directory/file structure and the single merged directory/file structure to create a unified directory/file structure.

19. The system of claim 14, wherein the portable device includes a plurality of portable devices each containing a portion of the first dataset and each copying their portion of the first dataset to the remote storage, wherein each of the plurality of portable devices are able to access the second dataset when connected to the remote storage even if some of the content within the second dataset was never stored therein.

20. The system of claim 14, wherein the portable device includes a plurality of portable devices each maintaining a portion of the first dataset and having an associated portion of the second directory/file structure, wherein the remote storage includes a plurality of networked storage units each maintaining a portion of the second dataset and having an associated portion of the third directory/file structure, wherein each of the plurality of portable devices copy the portion of the first dataset maintained therein to some subset of the plurality of networked storage units, wherein each of the plurality of portable devices are able to access the second dataset when connected to the plurality of networked storage units even if some of the content within the second dataset was never stored therein.

21. The system of claim 20, wherein the plurality of networked storage units are networked to a computer and the computer is to aggregate the portions of the third directory/file structure associated with each of the plurality of networked storage units and merge any overlaps in the portions of the third directory/file structure associated with each of the plurality of networked storage units to generate the third directory/file structure and share the third directory/file structure with the plurality of portable devices, wherein the plurality of portable devices identify on the single merged directory/file structure which content will be available thereto when the portable device is not connected to the plurality of networked storage units.

22. The system of claim 20, wherein each of the plurality of portable devices is to aggregate the portions of the third directory/file structure associated with each of the plurality of networked storage units and merge any overlaps in the portions of the third directory/file structure associated with each of the plurality of networked storage units to generate the third directory/file structure, and wherein the third directory/file structure is same for each of the plurality of portable devices.

23. The system of claim 20, wherein one of the plurality of portable devices is to aggregate the portions of the third directory/file structure associated with each of the plurality of networked storage units and merge any overlaps in the portions of the third directory/file structure associated with each of the plurality of networked storage units to generate the third directory/file structure, and share the third directory/file structure with other of the plurality of portable devices.

24. An apparatus comprising:
a processor;
a user interface;
communications link to a content storage medium, wherein the remote storage medium includes a first dataset having a first directory/file structure and a second dataset having a second directory/file structure; and
a processor-readable storage medium to store content and processor executable instructions which when executed by the processor cause the processor to:
create a third directory/file structure for the content obtained by the user and stored in the processor-readable storage medium;
when necessary based on limited storage capability of the processor-readable storage medium, delete a portion of the content stored therein and only maintain a subset of the content as a third dataset, wherein the third dataset has a fourth directory/file structure that is a subset of the third directory/file structure;
when the apparatus and the remote storage medium are connected, copy the content not included in the remote storage medium from the processor-readable storage medium to the remote storage medium, wherein the remote storage medium simply stores the content based on instructions from the apparatus and does not require a server to manage memory allocation therebetween, wherein the remote storage medium maintains all content copied thereto as the first dataset, wherein the first dataset includes all content subsequently deleted from the processor-readable storage medium and not included in the third dataset, wherein the first dataset has the first directory/file structure, and wherein the first directory/file structure and the fourth directory/file structure overlap;
aggregate the first directory/file structure and the second directory/file structure to create a single location based directory/file structure;
create a virtual directory/file structure for content contained within the single location based directory/file structure based on parameters about the content rather than location of the content, wherein the parameters about the content are obtained from some subset of the content, data within the content, metadata associated with the content, or files associated with the content; and
present the virtual directory/file structure to users via the user interface.

25. The apparatus of claim 24, which when executed by the processor the processor executable instructions further cause the processor to
aggregate the virtual directory/file structure and the single location based directory/file structure to create a unified directory/file structure; and
present the unified directory/file structure to the users via the user interface.

26. The apparatus of claim 24, wherein the remote storage medium is included in a networked device and the apparatus shares the virtual directory/file structure with the networked device.

* * * * *